(12) United States Patent
Lv et al.

(10) Patent No.: US 11,100,047 B2
(45) Date of Patent: Aug. 24, 2021

(54) METHOD, DEVICE AND COMPUTER PROGRAM PRODUCT FOR DELETING SNAPSHOTS

(71) Applicant: EMC IP Holding Company LLC, Hopkinton, MA (US)

(72) Inventors: Shuo Lv, Beijing (CN); Huan Chen, Beijing (CN); Guoyu Hu, Beijing (CN); Chao Han, Beijing (CN); Qiaosheng Zhou, Beijing (CN); Jian Liu, Beijing (CN); Chen Gong, Beijing (CN); Congyue Gu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 281 days.

(21) Appl. No.: 16/238,710

(22) Filed: Jan. 3, 2019

(65) Prior Publication Data

US 2019/0324947 A1 Oct. 24, 2019

(30) Foreign Application Priority Data

Apr. 20, 2018 (CN) .......................... 201810360804.0

(51) Int. Cl.
*G06F 16/00* (2019.01)
*G06F 16/16* (2019.01)
*G06F 11/14* (2006.01)
*G06F 16/11* (2019.01)

(52) U.S. Cl.
CPC ........ *G06F 16/162* (2019.01); *G06F 11/1451* (2013.01); *G06F 16/128* (2019.01); *G06F 2201/84* (2013.01)

(58) Field of Classification Search
CPC .. G06F 16/162; G06F 11/1451; G06F 16/128; G06F 2201/84; G06F 2201/81; G06F 11/1448
See application file for complete search history.

(56) References Cited

U.S. PATENT DOCUMENTS

| 7,577,817 B2 | 8/2009 | Karpoff et al. |
| 7,831,560 B1 * | 11/2010 | Spertus ................. G06F 16/162 |
| | | 707/639 |
| 7,941,632 B2 | 5/2011 | Karpoff et al. |

(Continued)

FOREIGN PATENT DOCUMENTS

| CN | 109117308 A | * | 1/2019 |
| CN | 110018985 A | * | 7/2019 |

*Primary Examiner* — Augustine K. Obisesan
(74) *Attorney, Agent, or Firm* — BainwoodHuang (57) ABSTRACT

Techniques delete snapshots. The techniques involve: in response to a data block to which a plurality of snapshots of a file to be deleted point being shared, determining whether a physical address of the data block to which the plurality of snapshots to be deleted point is the same as a target physical address of a data block to which a target snapshot of the file points. The techniques further involve: in response to the physical address of the data block to which the plurality of snapshots to be deleted point being the same as the target physical address, setting flag bits associated with the plurality of snapshots to be deleted to a first state. The techniques further involve: in response to detecting the first state, updating a target weight with a sum of weights of the plurality of snapshots to be deleted (e.g., respective quotas).

20 Claims, 5 Drawing Sheets

(56) References Cited

U.S. PATENT DOCUMENTS

| | | | |
|---|---|---|---|
| 7,953,819 B2 | 5/2011 | Liang et al. | |
| 8,032,498 B1 | 10/2011 | Armangau et al. | |
| 8,190,850 B1 * | 5/2012 | Davenport | G06F 16/10 |
| | | | 711/202 |
| 8,412,688 B1 | 4/2013 | Armangau et al. | |
| 9,460,102 B1 * | 10/2016 | Bono | G06F 3/0641 |
| 10,146,782 B1 | 12/2018 | Bono et al. | |
| 10,216,757 B1 | 2/2019 | Armangau et al. | |
| 10,242,011 B1 | 3/2019 | Basov et al. | |
| 10,242,012 B1 | 3/2019 | Basov et al. | |
| 10,248,336 B1 * | 4/2019 | Koujalagi | G06F 11/1438 |
| 10,261,944 B1 | 4/2019 | Armangau et al. | |
| 10,387,369 B1 | 8/2019 | Davenport et al. | |
| 10,482,065 B1 * | 11/2019 | Armangau | G06F 16/128 |
| 10,809,932 B1 | 10/2020 | Armangau et al. | |
| 2004/0186900 A1 * | 9/2004 | Nakano | G06F 11/1448 |
| | | | 709/213 |

* cited by examiner

METHOD, DEVICE AND COMPUTER PROGRAM PRODUCT FOR DELETING SNAPSHOTS

FIELD

Embodiments of the present disclosure relate to storage systems, and more specifically, to a method, device and computer program product for deleting snapshots in a file system.

BACKGROUND

In a storage system, one or more file systems and snapshots of the file systems are typically created based on physical storage devices having a certain storage capacity. A snapshot is a copy of a file in the file system at a specific time point. The copy includes an image of data at a time point when the copy starts, which can enable fast data recovery where logical errors or file corruption occur to the storage device.

If some snapshots are no longer needed or the number of snapshots exceeds a threshold, the snapshots may be deleted in order to release a storage space. Currently, a plurality of snapshots are deleted one by one. Therefore, read and writing operations of relevant metadata need to be performed for each snapshot, which costs a large quantity of time and prevents the storage space from being released rapidly.

SUMMARY

Embodiments of the present disclosure provide a method, device and computer program product for deleting snapshots.

In a first aspect, there is provided a method of deleting snapshots. The method includes: in response to a data block to which a plurality of snapshots of a file to be deleted point being shared, determining whether a physical address of the data block to which the plurality of snapshots to be deleted point is the same as a target physical address of a data block to which a target snapshot of the file points. The method further includes: in response to the physical address of the data block to which the plurality of snapshots to be deleted point being the same as the target physical address, setting flag bits associated with the plurality of snapshots to be deleted to a first state. The method further includes: in response to detecting the first state, updating a target weight with a sum of weights of the plurality of snapshots to be deleted, the weights of the plurality of snapshots to be deleted and the target weight indicating quotas of the plurality of snapshots to be deleted and a quota of the target snapshot sharing the pointed data block, respectively.

In some embodiments, updating the target weight includes: comparing a sum of the weights of the plurality of snapshots to be deleted and the target weight with a threshold weight; and in response to the sum of the weights of the plurality of snapshots to be deleted and the target weight being below the threshold weight, updating the target weight with the sum of the weights of the plurality of snapshots to be deleted and the target weight.

In some embodiments, the method further includes: in response to a first physical address of a data block to which a first snapshot of the plurality of snapshots to be deleted being different from the target physical address, setting flag bits associated with the first snapshot to a second state, the second state being different from the first state, and storing the first physical address.

In some embodiments, the method further includes: in response to a second physical address of a data block to which a second snapshot of the plurality of snapshots to be deleted being different from the target physical address, the second snapshot being different from the first snapshot, determining whether the second physical address is the same as the first physical address, in response to the second physical address being the same as the first physical address, setting the flag bits associated with the first snapshot and flag bits associated with the second snapshot to a third state, the third state being different from the first state and the second state, and in response to detecting the third state, updating a total weight associated with the data block to which the first snapshot points with a sum of a first weight of the first snapshot and a second weight of the second snapshot, the first weight and the second weight each accounting for a respective proportion of the total weight.

In some embodiments, the method further includes: storing a physical address of block metadata associated with the data block to which the first snapshot points, the block metadata recording the total weight.

In some embodiments, the method further includes: comparing the sum of the first weight and the second weight with the total weight; in response to the sum of the first weight and the second weight being equal to the total weight, changing the third state of the flag bits associated with the first snapshot and the flag bits associated with the second snapshot to a fourth state; and in response to detecting the fourth state, releasing the data block to which the first snapshot points.

In some embodiments, the method further includes: determining the physical address of the data block to which the plurality of snapshots to be deleted point based on a file offset of the plurality of snapshots to be deleted, a size of the data block to which the plurality of snapshots to be deleted point, and a size of a leaf indirect block associated with the plurality of snapshots to be deleted.

In a second aspect, there is provided an electronic device. The electronic device includes at least one processor and at least one memory. The at least one memory is coupled to the at least one processor and stores instructions to be executed by the at least one processor. The instructions, when executed by the at least one processor, cause the device to perform acts including: in response to a data block to which a plurality of snapshots of a file to be deleted point being shared, determining whether a physical address of the data block to which the plurality of snapshots to be deleted point is the same as a target physical address of a data block to which a target snapshot of the file points; in response to the physical address of the data block to which the plurality of snapshots to be deleted point being the same as the target physical address, setting flag bits associated with the plurality of snapshots to be deleted to a first state; and in response to detecting the first state, updating a target weight with a sum of weights of the plurality of snapshots to be deleted, the weights of the plurality of snapshots to be deleted and the target weight indicating quotas of the plurality of snapshots to be deleted and a quota of the target snapshot sharing the pointed data block, respectively.

In a third aspect, there is provided a computer program product. The computer program product is tangibly stored on a non-transient computer readable medium and includes machine executable instructions which, when executed, cause a machine to execute the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure in the accompanying drawings, the above and other objects, features and advantages of the present disclosure will become more apparent, wherein the same reference generally refers to the same components in the embodiments of the present disclosure.

Throughout the figures, the same or similar reference numerals denote the same or similar components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail with reference to the accompanying drawings, in which the example embodiments of the present disclosure have been illustrated. However, it is to be understood the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As used herein, the term "comprise" and its variants are to be read as open terms that mean "includes, but is not limited to." The term "based on" is to be read as "based at least in part on." The terms "one example embodiment" and "one embodiment" are to be read as "at least one example." The term "another embodiment" is to be read as "at least one other embodiment." The terms "first," "second," and the like may refer to different or same objects. Other definitions, explicit and implicit, may be included below.

Figure 1:
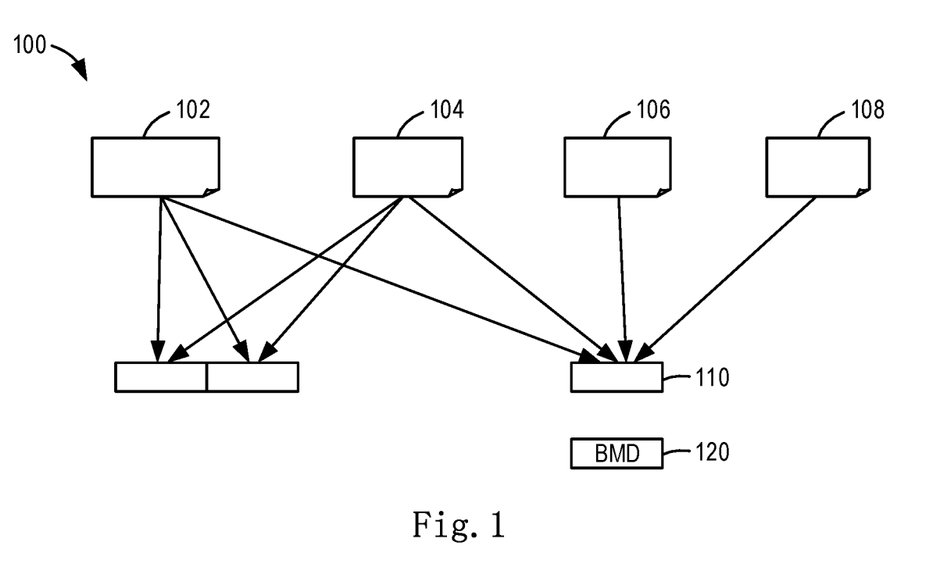
FIG. 1 shows a schematic view of a storage system.

FIG. 1 shows a schematic view of a storage system 100. As depicted, the storage system 100 includes a source file 102 and snapshots 104, 106 and 108 of the source file 102. For the brevity purpose, only three snapshots of the source file 102 are shown in FIG. 1. However, it should be appreciated that the source file 102 may include more snapshots.

The source file 102 and the snapshots 104, 106 and 108 of the source file 102 share a data block 110. In order to indicate sharing of the data block 110, the source file 102 and its snapshots 104, 106 and 108 are assigned with weights W0, W1, W2 and W3 respectively. The weights W0, W1, W2 and W3 are stored in leaf indirect blocks (IBs) associated with the source file 102 and the snapshots 104, 106 and 108 respectively. A total weight associated with the data block 110 is stored in block metadata (BMD) 120 associated with the data block 110.

Because a plurality of snapshots share a single data block, there is a need to adjust the allocation of weights among the snapshots when one of the snapshots is deleted. For example, a weight of a snapshot to be deleted may be merged into a weight of a retained snapshot (abbreviated as "merge weight" operation hereinafter). For example, when the snapshot 106 is deleted, the weight W1 of the snapshot 104 may be read from the leaf indirect block associated with the snapshot 104, the weight W2 of the snapshot 106 is added to the weight W1 of the snapshot 104 to obtain a total weight W2+W1, and then the weight of the snapshot 104 is updated with the total weight W2+W1. If the snapshot 108 needs to be further deleted, the weights of the snapshot 108 may be merged into the weight of the snapshot 104 likewise. It can be seen when a plurality of snapshots are to be deleted, the merge weight operation needs to be performed on each of the snapshots to be deleted. That is, the read and writing operations of a weight to be updated needs to be performed several times, which is time-consuming. When there are a large number of snapshots to be deleted, the deleting operations may cost several days so that the storage space cannot be released rapidly.

When one snapshot is deleted, the merge weight operation may be not performed, but the BMD associated with the shared data block is updated (abbreviated as "return weight" operation hereinafter). Description is presented below with reference to FIG. 2.

Figure 2:
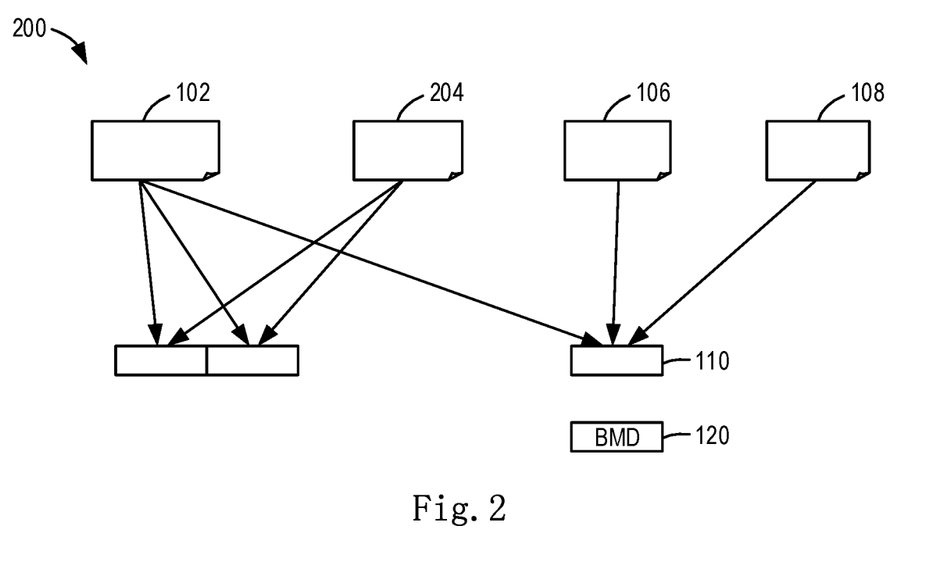
FIG. 2 shows a schematic view of another storage system.

FIG. 2 shows a schematic view of a storage system 200. As depicted, the storage system 200 includes a source file 102 and snapshots 204, 106 and 108 of the source file 102. For the brevity purpose, only three snapshots of the source file 102 are shown in FIG. 2. However, it should be appreciated that the source file 102 may include more snapshots.

FIG. 2 is different from FIG. 1 in that the source file 102 and its snapshots 106 and 208 share a data block 210 while the snapshot 204 does not share the data block 110. In order to indicate sharing of the data block 210, the source file 102 and its snapshots 106 and 108 are assigned with weights W4, W5 and W6 respectively. Unlike FIG. 1, since the snapshot 204 does not share the data block 110, when the snapshot 106 is deleted, the weight W5 of the snapshot 106 cannot be merged into the weight of the snapshot 204 and a total weight stored in the BMD 120 is updated with the weight W5 of the snapshot 106. That is, the weight W5 is subtracted from the total weight. If the snapshot 108 needs to be deleted further, the weight W6 may be subtracted from the total weight in the same way. It can be seen that when a plurality of snapshots are to be deleted, the total weight needs to be updated with respect to each of the snapshots to be deleted. That is, the read and writing operations need to be performed on the total weight several times, which is time-consuming.

To at least partially solve the above and other potential problems, the embodiments of the present disclosure provide a solution for concurrently deleting plurality of snapshots. According to various example embodiments of the present disclosure, flag bits of a plurality of snapshots sharing a single data block are set to a predetermined state, and snapshots whose flag bits are set to the same state are concurrently deleted. Thereby, read and writing operations of metadata associated with snapshots are reduced, and the efficiency of deleting snapshots is improved. With reference to FIGS. 3 to 7, a detailed description is presented below to a method for deleting snapshots according to the embodiments of the present disclosure.

Figure 3:
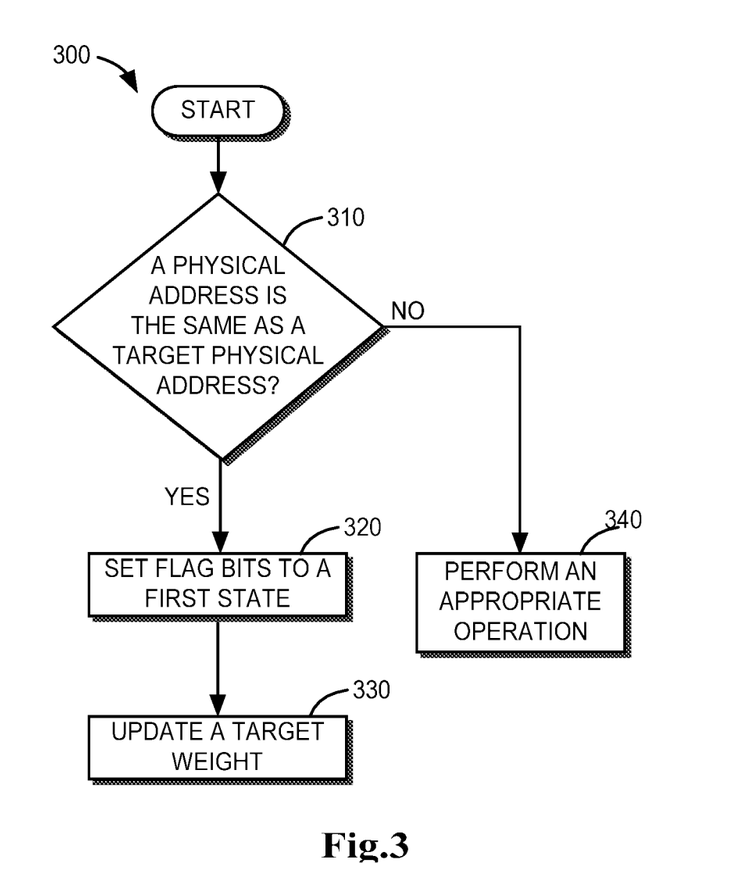
FIG. 3 shows a flowchart of a method of deleting snapshots according to one embodiment of the present disclosure.

FIG. 3 shows a flowchart of a method 300 of deleting snapshots according to one embodiment of the present disclosure. In some embodiments, the method 300 may be implemented by a storage system 100, e.g. by a control unit or a controller of the storage system 100. In other embodiments, the method 300 may also be implemented by a computing device independent of the storage system 100. It should be appreciated that the method 300 may further include additional steps that are not shown and/or may omit a step that is shown, and the scope of the present disclosure is not limited in this regard. For the discussion convenience, the method 300 may be discussed in conjunction with FIG. 1. Specifically, illustration is presented by taking the snapshots 106 and 108 in FIG. 1 as examples of snapshots to be deleted and taking the snapshot 104 as an example of a target snapshot. It should be appreciated that although two snapshots to be deleted are depicted in FIG. 1, this specific number is merely by way of example and not intended to limit the scope of the embodiments of the present disclosure in any way. In other embodiments, the storage system 100 may include a different number of snapshots to be deleted.

At 310, in response to a data block to which a plurality of snapshots of a file to be deleted point being shared, it is determined whether a physical address of the data block to which the plurality of snapshots to be deleted point is the same as a target physical address of a data block to which a target snapshot of the file points. That is, it is determined whether the plurality of snapshots to be deleted and the target snapshot share the same data block.

In some embodiments, any snapshot of the file that is not to be deleted may be selected as the target snapshot. For example, a snapshot whose creation time is close to the creation time of the snapshot to be deleted may be selected as the target snapshot. In the example of FIG. 1, the plurality of snapshots to be deleted may include the snapshots 106 and 108, and the snapshot 104 may be selected as the target snapshot. In such an example, it may be determined whether a physical address of a data block to which the snapshots 106 and 108 point is the same as a physical address of a data block to which the target snapshot 104 points.

In some embodiments, it may be determined from information recorded in a leaf IB associated with a snapshot to be deleted whether the data block to which the snapshot points is shared, i.e., whether the data block to which the snapshot point is a shared data block. In some embodiments, the physical address of the data block to which the snapshot points may be obtained from the leaf IB associated with the snapshot.

In an operating system such as UNIX, file system metadata usually includes inodes, indirect blocks (hereinafter referred to as IBs for short), etc. IBs are the most important metadata, each of which is a pointer space allocated dynamically and pointing to a data block (i.e. a storage unit for storing data) of a file. IBs are organized in a hierarchy, called as an "IB tree", where an IB at an upper level is used to store an address of an IB at a lower level, and an IB at the lowest level (i.e. a leaf IB) is used to store addresses of data blocks.

Figure 4:
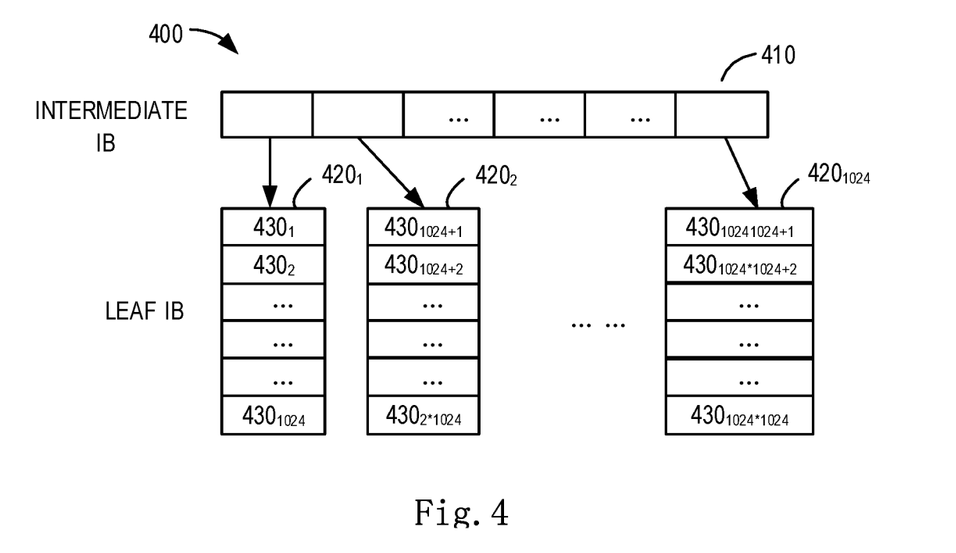
FIG. 4 shows a schematic view of an IB hierarchy according to the embodiments of the present disclosure.

FIG. 4 shows a schematic view of an IB hierarchy 400 according to the embodiments of the present disclosure. For the purpose of description brevity, only two layers of IBs are shown in FIG. 4, i.e., leaf IBs and upper-layer IBs (also referred to as "intermediate IBs" in this specification) of the leaf IBs. However, it should be appreciated that the IB hierarchy 400 may include more layers.

Each IB may include a plurality of mapping pointers (MPs). For the illustration purpose only, in the example of FIG. 4, each IB includes 1024 MPs. However, this number is merely by way of example and not intended to limit the scope of the embodiments of the present disclosure in any way. Each MP may include addresses of lower-layer indirect blocks or physical addresses of data blocks. As shown in FIG. 4, an intermediate IB 410 includes 1024 MPs, i.e., MPs $410_1, 410_2, \ldots, 410_{1024}$, which record addresses of leaf IBs $410_1, 410_2, \ldots, 410_{1024}$ respectively. Meanwhile, each leaf IB includes 1024 MPs used for recording addresses of 1024 data blocks respectively. For example, the leaf IB $420_1$ includes MP $430_1, 430_2, \ldots, 430_{1024}$, the leaf IB $420_2$ includes MP $430_{1024+1}, 430_{1024+2}, \ldots, 430_{2 \times 1024}$, and the leaf IB $420_{1024}$ includes MP $430_{1023 \times 1024+1}, 430_{1023 \times 1024+2}, \ldots, 430_{1024 \times 1024}$.

Figure 5:
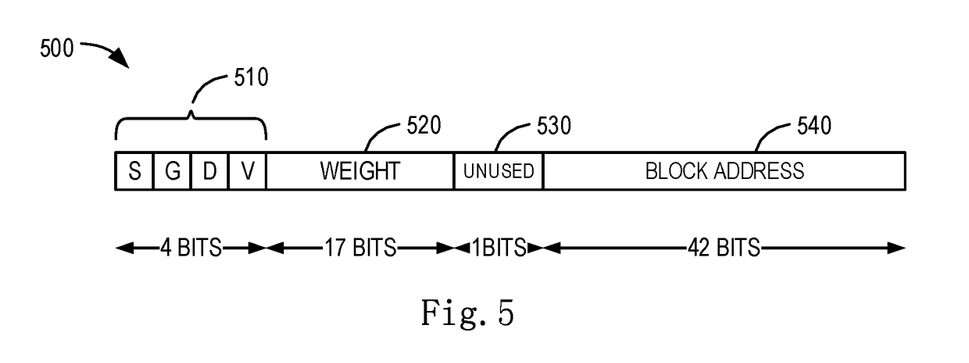
FIG. 5 shows a schematic view of MP according to the embodiments of the present disclosure.

In some embodiments, in addition to recording a physical address of a data block, the MP may further include an attribute field, a weight field and so on. FIG. 5 shows a schematic view of an MP 500 according to the embodiments of the present disclosure.

As shown in FIG. 5, the MP 500 includes an attribute field 510, a weight field 520, an unused field 530 and a block address field 540.

The attribute field 510 includes 4 bits of flag bits S, G, D and V. The flag bit S is a shared flag bit indicating whether a data block to which the MP 500 points is a shared data block. The flag bit G indicates whether there is a block digest in BMD of the data block to which the MP 500 points. The flag bit D indicates whether the MP 500 points to a data block whose block address may be calculated according to an algorithm. The flag bit V indicates whether the MP 500 is a virtual pointer. The flag bit S may be set to a predetermined state (e.g. 1) so as to indicate the data block to which the MP 500 points is a shared data block, otherwise may be set to another state (e.g. 0). The flag bits G, D and V are set likewise, which is ignored here. If the flag bits D and V are set to the same state (e.g. both are set to 1), this indicates the data block to which the MP 500 points is a bad block.

The weight field 520 includes 17 bits recording weights assigned to files or snapshots of files. The weights indicate quotas of files or snapshots of files sharing the data block to which the MP 500 points. The unused field 530 includes 1 bit which is retained for future use. The block address field 540 includes 2 bits recording a physical address of the data block to which the MP 500 points.

As seen from FIG. 5, it may be determined according to information recorded in the MP in the leaf IB associated with the snapshot to be deleted whether the data block to which the snapshot to be deleted points is a shared data block. For example, if a shared flag bit in an MP is set to 1, it may be determined that a data block to which the MP points is a shared data block. In addition, the physical address of the data block to which the snapshot to be deleted points may be determined according to a block address field of the MP in the leaf IB associated with the snapshot to be deleted. The physical address of the data block to which the target snapshot points (also referred to as "target physical address" hereinafter) may be determined according to a block address field of an MP in a leaf IB associated with the target snapshot.

It will be appreciated that the structure of the MP 500 as shown in FIG. 5 is merely by way of example and not intended to limit the scope of the embodiments of the present disclosure in any way, and an MP having other structure is also possible.

Still with reference to FIG. 3, if it is determined at 310 that the physical address of the data block to which the plurality of snapshots to be deleted point is the same as the target physical address of the data block to which the target snapshot of the file points, the method 300 proceeds to 320 at which flag bits associated with the plurality of snapshots to be deleted are set to a first state. In the example of FIG. 1, flag bits associated with the snapshot 106 may be set to the first state, and flag bits associated with the snapshot 108 may be set to the first state.

The first state may indicate the plurality of snapshots are to be deleted through the "merge weight" operation. For example, where flag bits of 3 bits is used, the flag bits may be set to 000 so as to indicate the plurality of snapshots are to be deleted through the "merge weight" operation.

At 330, in response to detecting the first state, the target weight is updated with a sum of weights of the plurality of snapshots to be deleted. The weights of the plurality of snapshots to be deleted and the target weight indicate respective quotas of the plurality of snapshots and the target snapshot sharing the pointed data block. In the example of FIG. 1, the target weight W1 of the target snapshot 104 may be updated with a sum of the weight W2 of the snapshot 106 and the weight W3 of the snapshot 108. That is, the target weight W1 of the target snapshot 104 is changed to W1+W2+W3.

According to the embodiments of the present disclosure, flag bits of plurality of snapshots sharing a single data block are set to a predetermined state, and the weight of the target snapshot is updated with a sum of weights of the plurality of snapshots whose flag bits are set to the predetermined state. This is different from the traditional solution where the weight of the target snapshot is updated with a weight of a single snapshot one by one. Therefore, read and writing operations on the target weight are reduced, and the efficiency of deleting snapshots is improved.

In some embodiments, before updating the target weight of the target snapshot, the sum of the weights of the plurality of snapshots to be deleted and the target weight is compared with a threshold of the target weight (i.e., a threshold weight). If the sum of the weights of the plurality of snapshots to be deleted and the target weight is below the threshold weight, then the target weight is updated with the sum of the weights of the plurality of snapshots to be deleted and the target weight. Therefore, erroneous operations due to the sum of the weights of the plurality of snapshots to be deleted and the target weight exceeding the threshold of the target weight may be avoided.

In some embodiments, the physical address of the data block to which the plurality of snapshots to be deleted point may be determined based on a file offset of the plurality of snapshots to be deleted, a size of the data block to which the plurality of snapshots to be deleted point and a size of a leaf indirect block associated with the plurality of snapshots to be deleted. Compared with the traditional solution in which an IB tree associated with a snapshot to be deleted is traversed to determine a physical address of a data block to which the snapshot to be deleted points, the solution according to the embodiments of the present disclosure can locate a leaf IB of an IB tree associated with the snapshot to be deleted more rapidly, thereby faster determining the physical address of the data block to which the snapshot to be deleted points.

It may be appreciated that in an embodiment where the leaf IB associated with the snapshot to be deleted includes a plurality of (e.g. 1024) MPs, the method 300 may be performed with respect to each MP so as to delete a snapshot's sharing of a data block to which each MP points and further delete the snapshot.

On the other hand, if it is determined at 310 that the physical address of the data block to which the plurality of snapshots to be deleted point is different from the target physical address of the data block to which the target snapshot of the file points, then the method 300 proceeds to 340 at which an appropriate operation is performed. In some embodiments, at 340, the plurality of snapshots to be deleted are deleted according to the traditional solution. In other embodiments, at 340, the plurality of snapshots are deleted by performing a method 600 to be described with reference to FIG. 6 below.

Figure 6:
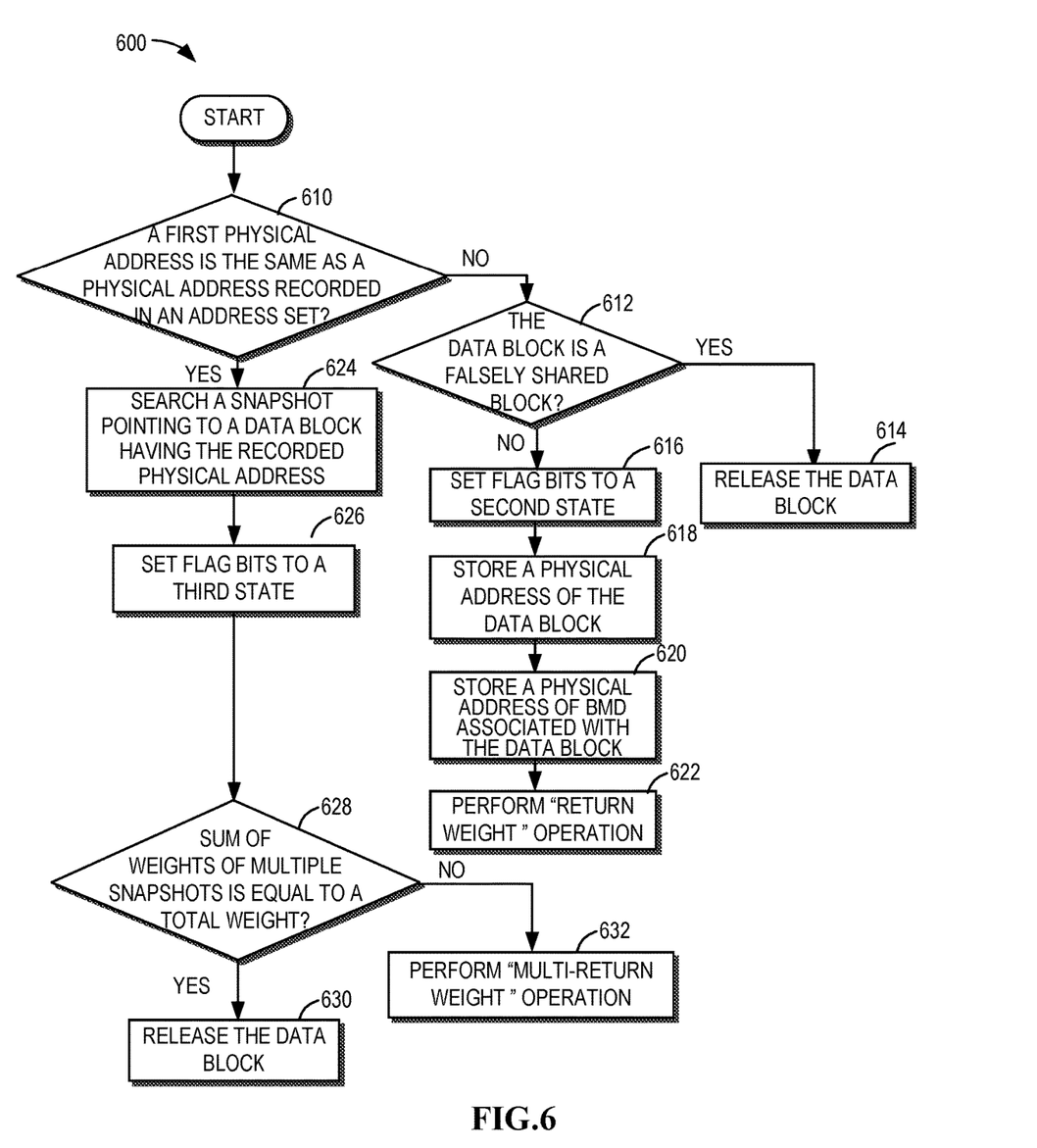
FIG. 6 shows a flowchart of a method of deleting snapshots according to another embodiment of the present disclosure.

FIG. 6 shows a flowchart of a method 600 of deleting snapshots according to another embodiment of the present disclosure. In some embodiments, the method 600 may be implemented by a storage system 200, e.g. by a control unit of a controller of the storage system 200. In other embodiments, the method 600 may also be implemented by a computing device independent of the storage system 200. It should be appreciated that the method 600 may further include an additional step that is not shown and/or may omit a step that is shown, and the scope of the present disclosure is not limited in this regard.

At 610, it is determined whether a first physical address of a data block to which a first snapshot of a plurality of snapshots to be deleted points is the same as a physical address recorded in an address set. The address set may be stored in memory, for example.

If it is determined at 610 that the first physical address is different from a physical address recorded in the address set, then the method 600 proceeds to 612 at which it is determined whether a data block having the first physical address is a falsely shared block. For example, a first weight of the first snapshot may be compared with a total weight recorded in BMD of the data block having the first physical address. If the first weight is equal to the total weight, then it may be determined that the first snapshot is a falsely shared block, i.e., no snapshot shares the data block having the first physical address with the first snapshot. Further, the data block is released at 614.

If it is determined at 612 that the data block having the first physical address is not a falsely shared block, then the method 600 proceeds to 616 at which flag bits associated with the first snapshot is set to a second state. The second state may indicate the first snapshot is to be deleted by performing the "return weight" operation. In addition, at 618 the first physical address is recorded in the address set so as to be compared with a physical address of a data block to which a subsequent snapshot points. At 620, a physical address of BMD associated with the data block having the first physical address is recorded in memory, so that it is no longer necessary to read the BMD by accessing a disk during subsequent use. At 622, if the physical address of the data block to which the subsequent snapshot points is the same as the first physical address, then the "return weight" operation is performed on the first snapshot in response to detecting the second state.

On the other hand, if it is determined at 610 that the first physical address is the same as a physical address recorded in the address set, then the method proceeds to 624 at which a snapshot pointing to a data block having the recorded physical address, e.g., a second snapshot is searched. At 626, the flag bits associated with the first snapshot and flag bits associated with the second snapshot are set to a third state. The third state may indicate that a plurality of snapshots are to be deleted by performing the "return weight" operation on the plurality of snapshots. The "return weight" operation performed on a plurality of snapshots is also referred to as "multi-return weight" operation below.

At 628, it is determined whether a sum of weights of the plurality of snapshots whose flag bits are set to the third state is equal to the total weight recorded in BMD associated with the data block having the first physical address. If the sum is equal to the total weight, then the method proceeds to 630 at which the data block having the first physical address is released. If the sum is not equal to the total weight, then the method proceeds to 632 at which the "multi-return weight" operation is performed on the snapshots whose flag bits are set to the third state in response to detecting the third state. That is, the total weight recorded in BMD is updated by subtracting a sum of weights of these snapshots from the total weight.

According to the embodiments of the present disclosure, flag bits of the plurality of snapshots (e.g. the first snapshot and the second snapshot) sharing a single data block are set to the third state, and a total weight of the data block is updated with a sum of weights of the plurality of snapshots whose flag bits are set to the third state. This is different from the traditional solution in which the total weight is updated with a weight of a single snapshot. Therefore, read of the total weight from the disk and writing of the total weight to the disk are reduced, and the efficiency of deleting snapshots is improved.

It should be appreciated that for the illustration purpose only, the method 600 has been described by taking the first snapshot and the second snapshot as examples. However, when the snapshots to be deleted include more than two snapshots, the method 600 may be executed with respect to each of snapshots to be deleted.

In some embodiments, to prevent inconsistency between data in memory and data in the disk due to unexpected power-off of the storage system, before the "merge weight", "return weight" and "multi-return weight" operations are performed on snapshots to be deleted in memory, the type of an operation to be performed on the MP associated with each snapshot to be deleted, and metadata associated with the operation are recorded in a log file.

As described above, each IB may include a plurality of MPs. For instance, the example in FIG. 4 shows that each IB includes 1024 MPs. In some embodiments, an offset may be assigned to each of the plurality of MPs. For instance, in the example that each IB includes 1024 MPs, offset 0, offset 1, . . . , offset 1023 may be assigned to 1024 MPs respectively. In the embodiments of the present disclosure, the following may be recorded in the log file: information indicating whether respective offsets of the plurality of snapshots to be deleted have been processed, the type of an operation to be performed, as well as metadata associated with the operation.

In some embodiments, a bitmap may be used for recording information indicating whether a respective offset has been processed. For example, in the bitmap, a bit associated with an offset may be set to a predetermined state (e.g. 1) so as to indicate the offset has been processed, e.g., the method 300 or 600 has been performed with respect to the offset. In addition, regarding the type of an operation to be performed and metadata associated with the operation, a record 700 as shown in FIG. 7 may be used.

Figure 7:
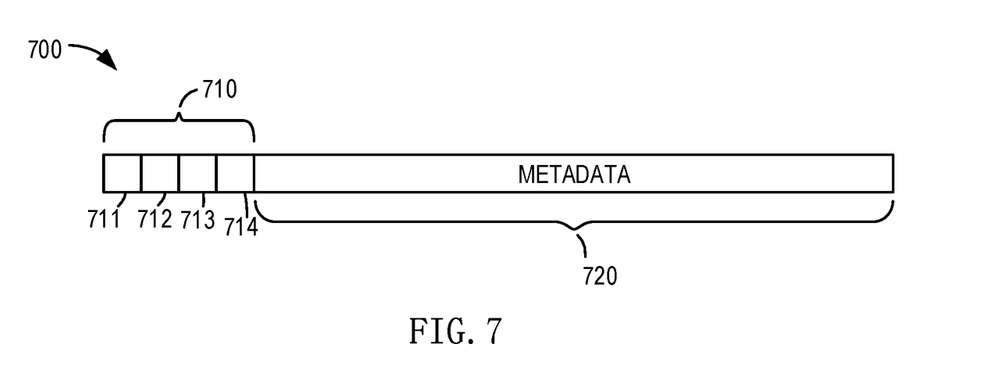
FIG. 7 shows an example of a record in a log file according to the embodiments of the present disclosure.

FIG. 7 shows an example of the record 700 in the log file according to the embodiments of the present disclosure. As depicted, the record 700 includes an operation code filed 710 and a metadata field 720.

The operation code field 710 includes flag bits 711 to 714 of 4 bits. The flag bits 711 to 713 each are used for indicating the type of an operation to be performed on a respective offset, and the flag bit 714 is retained for future use. For example, the flag bit 711 may indicate whether a "merge weight" operation will be performed on a respective offset, the flag bit 712 may indicate whether a "return weight" operation will be performed on a respective offset, and the flag bit 713 may indicate the start of data associated with the next offset.

In some embodiments, the metadata field 720 may include 32 bits for recording weight values associated with the "merge weight" operation. In other embodiments, the metadata field 720 may include 3×32 bits (i.e., 96 bits) for recording an updated total weight of a data block to which the offset points and a physical address of the data block with respect to the "return weight" operation.

It may be appreciated that the structure of the record 700 shown in FIG. 7 is merely by way of example and not intended to limit the scope of the embodiments of the present disclosure in any way, and it is also possible to use a record having other structure in the log file.

According to the embodiments of the present disclosure, logs may be recorded jointly for a plurality of snapshots to be deleted. Compared with the traditional solution in which a log is recorded separately for each snapshot to be deleted, the number of records is reduced, and the efficiency is improved.

FIG. 7 schematically illustrates a block diagram of a device 700 that can be used to implement embodiments of the present disclosure. As shown in FIG. 7, the device 700 includes a central processing unit (CPU) 701 that can perform various appropriate acts and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input unit 706, such as a keyboard, a mouse and the like; an output unit 707, such as various kinds of displays and a loudspeaker, or the like; a storage unit 708, such as a magnetic disk, an optical disk, or the like; a communication unit 709, such as a network card, a modem, and a wireless communication transceiver, or the like. The communication unit 709 allows the device 700 to exchange information/data with other devices through a computer network such as the Internet and/or various kinds of telecommunications networks.

Various processes and processing described above, e.g., the methods 200, 500 and 600, can be executed by the processing unit 701. For example, in some embodiments, the methods 200, 500 and/or 600 can be implemented as a computer software program that is tangibly embodied on a machine readable medium, e.g., the storage unit 708. In some embodiments, part or all of the computer programs can be loaded and/or mounted onto the device 700 via ROM 702 and/or communication unit 709. When the computer program is loaded to the RAM 703 and executed by the CPU 701, one or more steps of the methods 200, 500 and 600 as described above can be executed.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The terms "first," "second," and the like may refer to different or same objects. Other definitions, explicit and implicit, may be included in the context.

As used herein, the term "determining" covers various acts. For example, "determining" may include operation, calculation, process, derivation, investigation, search (for example, search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Those skilled in the art would appreciate that the above apparatus and method may be implemented with computer executable instructions and/or in processor-controlled code, and for example, such code is provided on a carrier medium such as a programmable memory or an optical or electronic signal bearer.

Further, although operations of the method according to the present disclosure are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It will also be noted that the features and functions of two or more units of the present disclosure may be embodied in one apparatus. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

Figure 8:
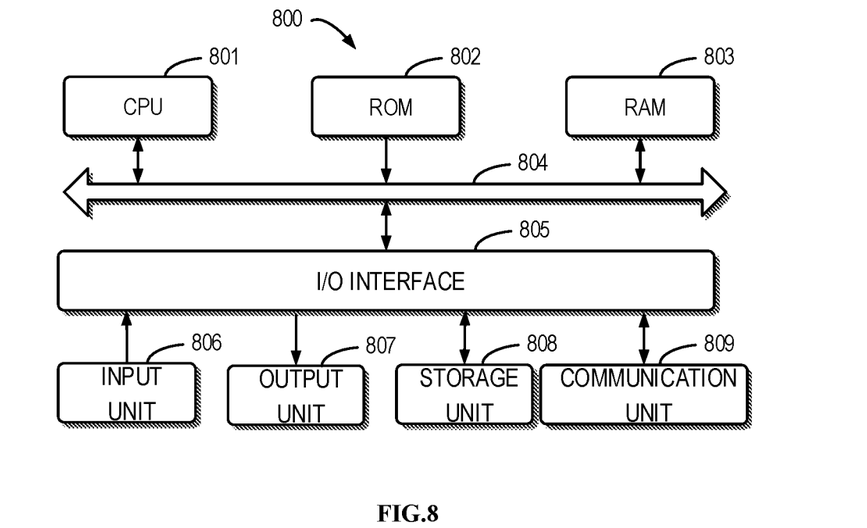
FIG. 8 shows a schematic block diagram of a device which is applicable to implement the embodiments of the present disclosure.

FIG. 8 shows a schematic block diagram of a device 800 which is applicable to implement the embodiments of the present disclosure. As shown in FIG. 8, the device 800 includes a central processing unit (CPU) 801 that can perform various appropriate acts and processing based on computer program instructions stored in a read-only memory (ROM) 802 or computer program instructions loaded from a storage unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input unit 806, such as a keyboard, a mouse and the like; an output unit 807, such as various kinds of displays and a loudspeaker, or the like; a storage unit 808, such as a magnetic disk, an optical disk, or the like; a communication unit 809, such as a network card, a modem, and a wireless communication transceiver, or the like. The communication unit 809 allows the device 800 to exchange information/data with other devices through a computer network such as the Internet and/or various kinds of telecommunications networks.

Various processes and processing described above, e.g., the methods 300 and 600, can be executed by the processing unit 801. For example, in some embodiments, the methods 300 and/or 600 can be implemented as a computer software program that is tangibly embodied on a machine readable medium, e.g., the storage unit 808. In some embodiments, part or all of the computer programs can be loaded and/or mounted onto the device 800 via ROM 802 and/or communication unit 809. When the computer program is loaded to the RAM 803 and executed by the CPU 801, one or more steps of the methods 300 and 600 as described above can be executed.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The terms "first," "second," and the like may refer to different or same objects. Other definitions, explicit and implicit, may be included in the context.

As used herein, the term "determining" covers various acts. For example, "determining" may include operation, calculation, process, derivation, investigation, search (for example, search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Those skilled in the art would appreciate that the above apparatus and method may be implemented with computer executable instructions and/or in processor-controlled code, and for example, such code is provided on a carrier medium such as a programmable memory or an optical or electronic signal bearer.

Further, although operations of the method according to the present disclosure are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It will also be noted that the features and functions of two or more units of the present disclosure may be embodied in one apparatus. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method of deleting snapshots, comprising:
in response to a data block to which a plurality of snapshots of a file to be deleted point being shared, determining whether a physical address of the data block to which the plurality of snapshots to be deleted point is the same as a target physical address of a data block to which a target snapshot of the file points;
in response to the physical address of the data block to which the plurality of snapshots to be deleted point being the same as the target physical address, setting flag bits associated with the plurality of snapshots to be deleted to a first state; and
in response to detecting the first state, updating a target weight with a sum of weights of the plurality of snapshots to be deleted, the weights of the plurality of snapshots to be deleted and the target weight indicating quotas of the plurality of snapshots to be deleted and a quota of the target snapshot sharing the pointed data block, respectively.

2. The method according to claim 1, wherein updating the target weight comprises:
comparing a sum of the weights of the plurality of snapshots to be deleted and the target weight with a threshold weight; and
in response to the sum of the weights of the plurality of snapshots to be deleted and the target weight being below the threshold weight, updating the target weight with the sum of the weights of the plurality of snapshots to be deleted and the target weight.

3. The method according to claim 1, further comprising:
in response to a first physical address of a data block to which a first snapshot of the plurality of snapshots to be deleted being different from the target physical address, setting flag bits associated with the first snapshot to a second state, the second state being different from the first state, and
storing the first physical address.

4. The method according to claim 3, further comprising:
in response to a second physical address of a data block to which a second snapshot of the plurality of snapshots to be deleted being different from the target physical address, the second snapshot being different from the first snapshot,
determining whether the second physical address is the same as the first physical address,
in response to the second physical address being the same as the first physical address, setting the flag bits associated with the first snapshot and flag bits associated with the second snapshot to a third state, the third state being different from the first state and the second state, and
in response to detecting the third state, updating a total weight associated with the data block to which the first snapshot points with a sum of a first weight of the first snapshot and a second weight of the second snapshot, the first weight and the second weight each accounting for a respective proportion of the total weight.

5. The method according to claim 4, further comprising:
storing a physical address of block metadata associated with the data block to which the first snapshot points, the block metadata recording the total weight.

6. The method according to claim 4, further comprising:
comparing the sum of the first weight and the second weight with the total weight;
in response to the sum of the first weight and the second weight being equal to the total weight, changing the third state of the flag bits associated with the first snapshot and the flag bits associated with the second snapshot to a fourth state; and
in response to detecting the fourth state, releasing the data block to which the first snapshot points.

7. The method according to claim 1, further comprising:
determining the physical address of the data block to which the plurality of snapshots to be deleted point based on a file offset of the plurality of snapshots to be deleted, a size of the data block to which the plurality of snapshots to be deleted point, and a size of a leaf indirect block associated with the plurality of snapshots to be deleted.

8. An electronic device, comprising:
at least one processor; and
at least one memory comprising computer program instructions, the at least memory and the computer program instructions being configured to, with the at least one processor, cause the device to perform acts comprising:
in response to a data block to which a plurality of snapshots of a file to be deleted point being shared, determining whether a physical address of the data block to which the plurality of snapshots to be deleted point is the same as a target physical address of a data block to which a target snapshot of the file points,
in response to the physical address of the data block to which the plurality of snapshots to be deleted point being the same as the target physical address, setting flag bits associated with the plurality of snapshots to be deleted to a first state, and
in response to detecting the first state, updating a target weight with a sum of weights of the plurality of snapshots to be deleted, the weights of the plurality of snapshots to be deleted and the target weight indicating quotas of the plurality of snapshots to be deleted and the target snapshot sharing the pointed data block, respectively.

9. The electronic device according to claim 8, wherein updating the target weight comprises:
comparing a sum of the weights of the plurality of snapshots to be deleted and the target weight with a threshold weight; and
in response to the sum of the weights of the plurality of snapshots to be deleted and the target weight being below the threshold weight, updating the target weight with the sum of the weights of the plurality of snapshots to be deleted and the target weight.

10. The electronic device according to claim 8, wherein the acts further comprise:
in response to a first physical address of a data block to which a first snapshot of the plurality of snapshots to be deleted being different from the target physical address,
setting flag bits associated with the first snapshot to a second state, the second state being different from the first state, and
storing the first physical address.

11. The electronic device according to claim 10, wherein the acts further comprise:
in response to a second physical address of a data block to which a second snapshot of the plurality of snapshots to be deleted being different from the target physical address, the second snapshot being different from the first snapshot,
determining whether the second physical address is the same as the first physical address,
in response to the second physical address being the same as the first physical address, setting the flag bits associated with the first snapshot and flag bits associated with the second snapshot to a third state, the third state being different from the first state and the second state, and
in response to detecting the third state, updating a total weight associated with the data block to which the first snapshot points with a sum of a first weight of the first snapshot and a second weight of the second snapshot, the first weight and the second weight each taking a respective proportion of the total weight.

12. The electronic device according to claim 11, wherein the acts further comprise:
storing a physical address of block metadata associated with the data block to which the first snapshot points, the block metadata recording the total weight.

13. The electronic device according to claim 11, wherein the acts further comprise: comparing the sum of the first weight and the second weight with the total weight;
in response to the sum of the first weight and the second weight being equal to the total weight, changing the third state of the flag bits associated with the first snapshot and the flag bits associated with the second snapshot to a fourth state; and
in response to detecting the fourth state, releasing the data block to which the first snapshot points.

14. The electronic device according to claim 8, wherein the acts further comprise: determining the physical address of the data block to which the plurality of snapshots to be deleted point based on a file offset of the plurality of snapshots to be deleted, a size of the data block to which the plurality of snapshots to be deleted point and a size of a leaf indirect block associated with the plurality of snapshots to be deleted.

15. A computer program product having a non-transitory computer readable medium which stores a set of instructions for deleting snapshots; the set of instructions, when carried out by computerized circuitry of a storage system, causing the computerized circuitry to perform a method of:
in response to a data block to which a plurality of snapshots of a file to be deleted point being shared, determining whether a physical address of the data block to which the plurality of snapshots to be deleted point is the same as a target physical address of a data block to which a target snapshot of the file points;

in response to the physical address of the data block to which the plurality of snapshots to be deleted point being the same as the target physical address, setting flag bits associated with the plurality of snapshots to be deleted to a first state; and
in response to detecting the first state, updating a target weight with a sum of weights of the plurality of snapshots to be deleted, the weights of the plurality of snapshots to be deleted and the target weight indicating quotas of the plurality of snapshots to be deleted and a quota of the target snapshot sharing the pointed data block, respectively.

16. The method according to claim 1 wherein the plurality of snapshots of the file to be deleted includes multiple snapshots that share a data block; and
wherein the method further comprises:
in response to flag bits associated with the multiple snapshots being set to a same state, concurrently deleting the multiple snapshots.

17. The electronic device according to claim 8 wherein the plurality of snapshots of the file to be deleted includes multiple snapshots that share a data block; and
wherein the acts further comprise:
in response to flag bits associated with the multiple snapshots being set to a same state, concurrently deleting the multiple snapshots.

18. The computer program product according to claim 15, wherein updating the target weight comprises:
comparing a sum of the weights of the plurality of snapshots to be deleted and the target weight with a threshold weight; and
in response to the sum of the weights of the plurality of snapshots to be deleted and the target weight being below the threshold weight, updating the target weight with the sum of the weights of the plurality of snapshots to be deleted and the target weight.

19. The computer program product according to claim 15, wherein the method further comprises:
in response to a first physical address of a data block to which a first snapshot of the plurality of snapshots to be deleted being different from the target physical address,
setting flag bits associated with the first snapshot to a second state, the second state being different from the first state,
storing the first physical address,
in response to a second physical address of a data block to which a second snapshot of the plurality of snapshots to be deleted being different from the target physical address, the second snapshot being different from the first snapshot,
determining whether the second physical address is the same as the first physical address,
in response to the second physical address being the same as the first physical address, setting the flag bits associated with the first snapshot and flag bits associated with the second snapshot to a third state, the third state being different from the first state and the second state, and
in response to detecting the third state, updating a total weight associated with the data block to which the first snapshot points with a sum of a first weight of the first snapshot and a second weight of the second snapshot, the first weight and the second weight each accounting for a respective proportion of the total weight.

20. The computer program product according to claim 15 wherein the plurality of snapshots of the file to be deleted includes multiple snapshots that share a data block; and wherein the method further comprises:
in response to flag bits associated with the multiple snapshots being set to a same state, concurrently deleting the multiple snapshots.

\* \* \* \* \*